Figure 1:
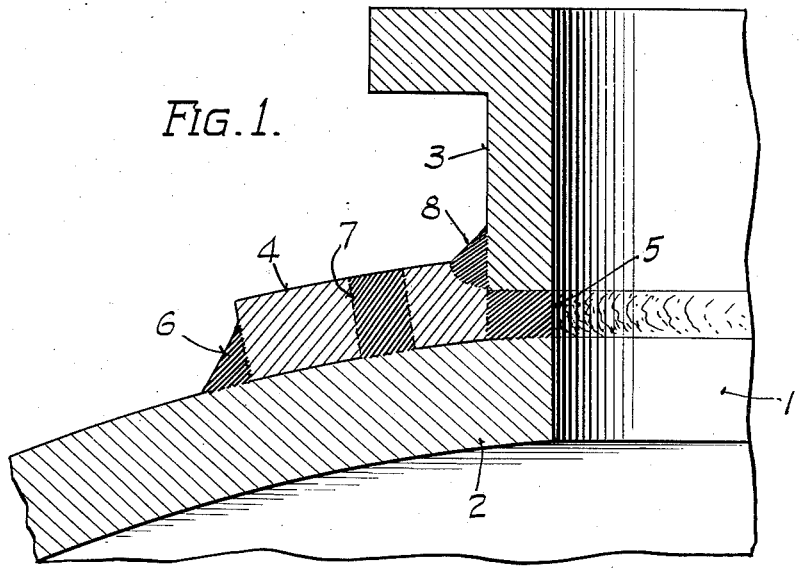

Oct. 30, 1934.　　　S. STRATY　　　1,978,609

WELDED MANWAY FOR PRESSURE VESSELS

Filed June 24, 1933

INVENTOR.
Stephen Straty
BY
ATTORNEY.

Patented Oct. 30, 1934

1,978,609

UNITED STATES PATENT OFFICE 1,978,609

WELDED MANWAY FOR PRESSURE VESSELS

Stephen Straty, Milwaukee, Wis., assignor to A. O. Smith Corporation, Milwaukee, Wis., a corporation of New York Application June 24, 1933, Serial No. 677,371

4 Claims. (Cl. 285—106)

This invention relates to welded manways for pressure vessels.

The object of the invention is to obtain a strong welded connection between a manway or nozzle and a vessel wall or flange.

Another object is to fabricate a manway or nozzle for pressure vessels requiring less welding and obtaining more economy of construction.

Other objects will appear in the following description of the preferred embodiment illustrated in the drawing.

Figure 1 of the drawing is a central section longitudinally of one side of a manway showing its connection to a vessel wall, and Fid. 2 is a similar section of a modified form of connection.

The usual practice in welding manway and nozzle necks to pressure vessels is to cut an opening in the vessel wall larger than the diameter of the neck, to insert the neck through the opening and to weld the edge of the wall to the outside of the neck. Where the vessel wall is of great thickness, this practice becomes costly due to the great amount of welding required and further to the waste of metal. The extra welding required may in some cases be objectionable due to stresses set up by it.

The present invention provides a much less costly structure and one just as strong with a minimum of welding and with practically no waste of metal. It is particularly adapted for use on end heads of heavy walled vessels.

In carrying out the invention, the opening 1 in the vessel wall 2 is cut out to a diameter equal to the required inside diameter of the manway neck 3.

A reenforcing collar 4 having an inside diameter equal to the outside diameter of the manway neck 3 is then positioned about the opening 1.

The manway neck 3 is then inserted into the opening in the reenforcing collar 4 a distance suitable to provide a welding groove represented in Fig. 1 as filled with weld metal 5. The welding groove is bounded by the outer surface of the vessel wall and end edge of the manway neck as sides of the groove, and the inner edge of the reenforcing collar as the bottom. Considerable saving is obtained in this manner since the groove does not have to be chamfered in the metal.

In welding the parts together the vessel is preferably placed in a horizontal position with the manway in the end head. Welding is started at the bottom side of the manway opening and the vessel is rotated to maintain the welding in a horizontal position as it progresses circumferentially about the opening. The weld metal 5 deposited in the groove just described joins the end of the manway neck, the inner edge of the reenforcing collar and the vessel wall into an integral structure.

The reenforcing collar 4 is then preferably welded to the vessel wall at the outer circumference of the collar by a fillet weld 6, and also, if desired, through holes 7 in the body of the collar. Also, where the reenforcing collar is of substantial thickness, it is preferable to deposit weld metal 8 at the juncture of the collar and the outer surface of the manway neck 3.

Figure 2:
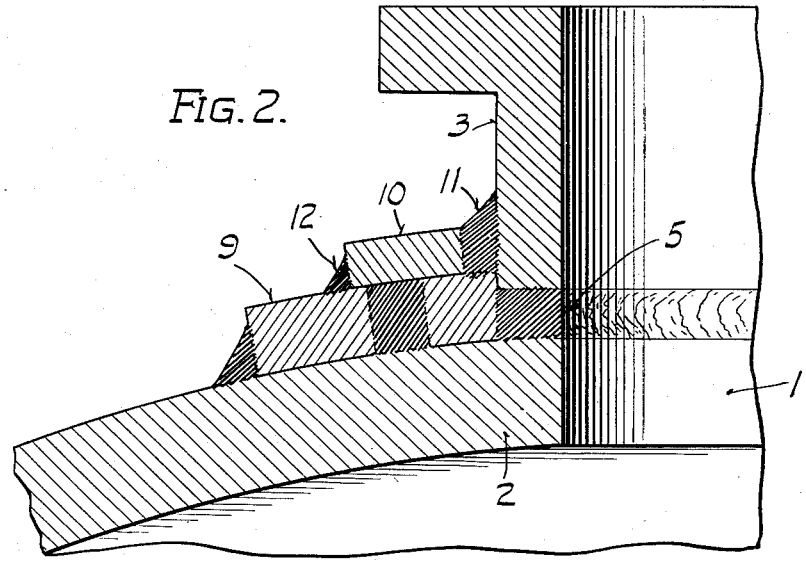

Fig. 2 illustrates a modification in which a double plate reenforcing collar is employed instead of a single thick plate. With this construction, the plate 9 is welded to the manway neck 3 and vessel wall 2 in much the same manner as described for the reenforcing collar 4 in Fig. 1. Then a second smaller reenforcing plate 10 is applied.

This plate 10 has a larger inside diameter than the outside diameter of the manway neck, so that when the plate is in position, a circumferential welding groove is formed between its inner edge and the outside wall of the manway neck, and having the outer surface of the plate 9 as its bottom.

Weld metal 11 is deposited in this groove to join the two reenforcing plates 9 and 10 and the manway neck 3 into an integral structure.

It is also preferable to apply a fillet weld 12 at the outside circumference of the plate 10 to join it to the outer surface of the plate 9, plate 10 being of less outside diameter than plate 9.

The invention may be employed in joining flanges to tubular necks in the same manner as described above for the joining of the tubular manway neck to the end head of a vessel.

Various modifications of the invention may be employed within the scope of the accompanying claims.

I claim:

1. A coupling for a tubular neck and a plate spaced from the end of the neck and having an opening therein of substantially the same diameter as the inside of said neck, comprising a collar encircling said neck and bridging the gap between it and the plate, and weld metal deposited in the space or groove bounded by the surface of the plate, the inner edge of the collar and the end edge of the neck to join said parts into an integral structure.

2. A manway or nozzle connection for heavy walled pressure vessels comprising a tubular neck having the same inside diameter as the opening in the vessel wall, a reenforcing collar having the same inside diameter as the outside diameter of the tubular neck, said neck having one end partially inserted in the opening of the collar to provide a welding groove facing radially inwardly of the opening and bounded by the outer surface of the vessel wall, the inner edge of the reenforcing collar and the end edge of the tubular neck, and weld metal deposited in said groove joining the parts into an integral structure.

3. A manway or nozzle connection for heavy walled pressure vessels comprising a tubular neck having the same inside diameter as the opening in the vessel wall, a reenforcing collar having the same inside diameter as the outside diameter of the tubular neck, said neck having one end partially inserted in the opening of the collar to provide a welding groove facing radially inwardly of the opening and bounded by the outer surface of the vessel wall, the inner edge of the reenforcing collar and the end edge of the tubular neck, weld metal deposited in said groove joining the parts into an integral structure, and an additional reenforcing plate encircling said tubular neck welded to said collar and tubular neck at the inner edge of the plate and to the collar at the outer circumferential edge of the plate.

4. A manway or nozzle connection for heavy walled pressure vessels comprising a tubular neck having the same inside diameter as the opening in the vessel wall, a reenforcing collar extending around the opening between the end of the neck and the vessel wall, weld metal joining the end of the neck to the reenforcing collar and to the outer face of said wall, and weld metal joining the reenforcing collar at its outer circumference to the vessel wall.

STEPHEN STRATY.